June 15, 1948.  R. B. SMITH  2,443,403
HEATED JOURNAL BEARING
Filed Feb. 15, 1945
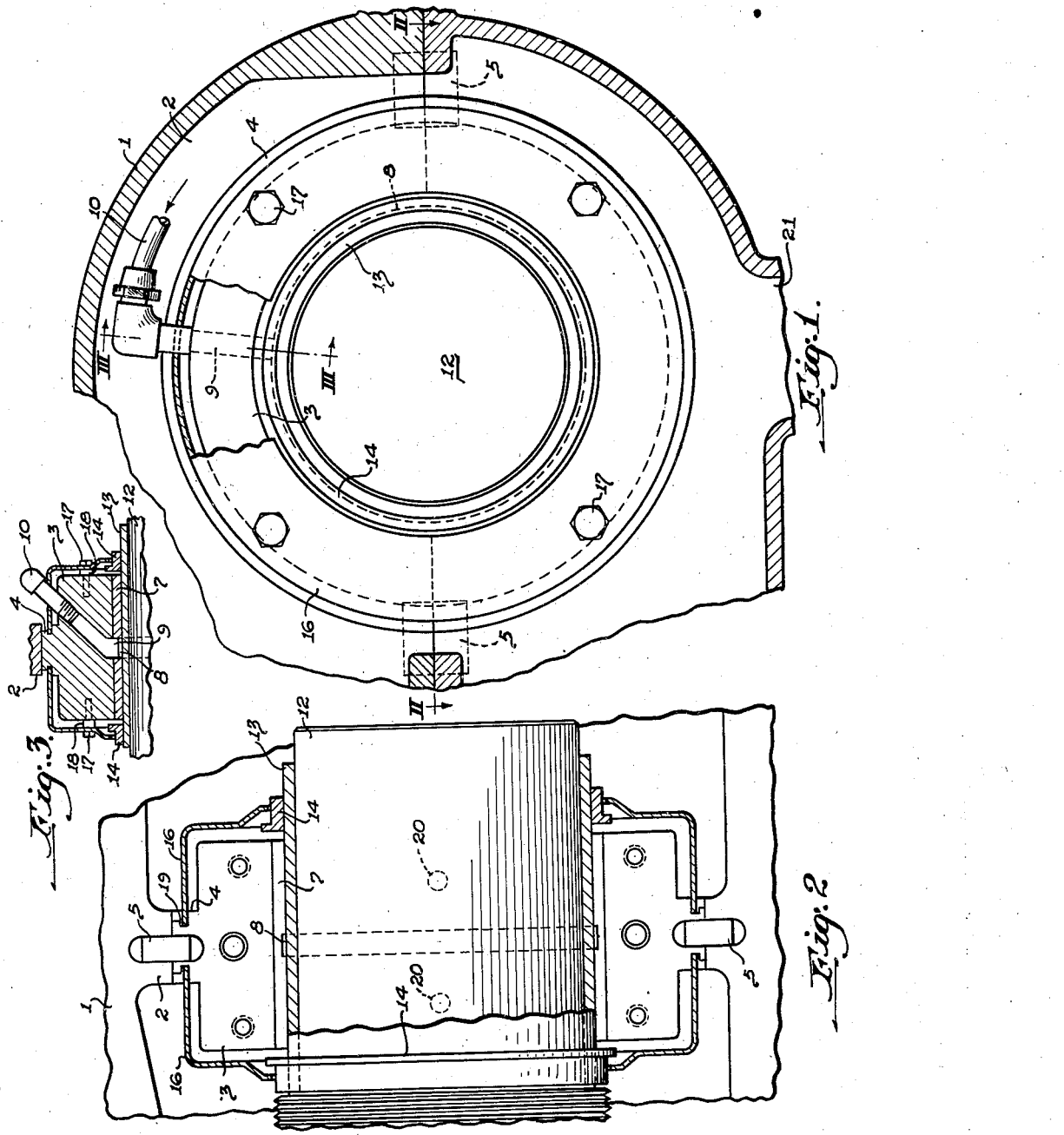
INVENTOR.
Ronald B. Smith
BY Brown, Critchlow & Flick
his ATTORNEYS.

Patented June 15, 1948

2,443,403

UNITED STATES PATENT OFFICE 2,443,403

HEATED JOURNAL BEARING

Ronald B. Smith, Greensburg, Pa., assignor to Elliott Company, Jeannette, Pa., a corporation of Pennsylvania Application February 15, 1945, Serial No. 577,947

4 Claims. (Cl. 308—76)

This invention relates to journal bearings, and more particularly to those lubricated by oil under pressure.

In pressure lubricated journal bearings a film of oil is maintained between the bearing sleeve and the shaft or journal rotating in it. In this type of bearing the oil is introduced under pressure to the central portion of the bearing surface and generally flows outwardly along that surface in opposite directions to the ends of the bearing. Frictional heat generated in the bearing causes the shaft to expand. However, expansion of the bearing sleeve, due to the heated oil on its inner surface, generally is restrained by the large mass of metal which forms the bearing block, so the clearance between the shaft and sleeve may be reduced. This in turn causes a reduction in the thickness of the oil film and thus a reduction in the quantity of oil flowing through the bearing. Therefore the bearing heats up all the more and proper lubrication is impaired.

In still other bearing designs the cooler inlet oil delivered by a pump is allowed to circulate in or around the bearing block or shell, thereby cooling the bearing shell.

It is among the objects of this invention to provide a pressure lubricated journal bearing for carrying heavy unit loads in which the clearance between the bearing sleeve and journal is maintained substantially constant, and in which the bearing block that supports the sleeve is heated, rather than cooled, to such a degree that it is maintained substantially as hot as the sleeve. A further object is to provide a method of maintaining the clearance in a journal bearing substantially constant.

In accordance with this invention a sleeve formed from suitable bearing material is supported in a bearing block that is mounted in position in any convenient manner. Journaled in the bearing is a rotating shaft. The bearing surfaces are lubricated by oil supplied to them under pressure through a passage extending through the bearing block and sleeve and terminating at its inner end at the central portion of the sleeve. Preferably, the passage ends in an annular groove with which the sleeve bearing surface is provided so that the entering oil will be carried around the shaft. The pressure behind the oil causes it to flow out of both sides of the groove and in a film along the bearing surface to the opposite ends of the sleeve. In doing so the oil becomes heated. As the hot oil leaves the bearing and flows out along the shaft it is intercepted by slinger rings that are rigidly mounted on the shaft. Rotation of these rings with the shaft causes them to throw the intercepted oil outwardly by centrifugal force. As the hot oil leaves the rings it is guided by a shield encircling them into contact with the ends and periphery of the bearing block. This oil, which is nearly as hot as the bearing surfaces that it just has left, heats up the bearing block and maintains it at a relatively high temperature, thereby causing it to expand radially. The result is that as the shaft expands, the bearing block expands and permits the bearing sleeve likewise to expand and maintain the desired clearance between the shaft and sleeve. Preferably, the central portion of the bearing block is encircled by an integral rib to the opposite sides of which the shield, which is divided in a radial plane into sections, is connected.

The preferred embodiment of the invention is illustrated in the accompanying drawings in which Fig. 1 is an end view of my journal bearing with part of the shield broken away to show the bearing block; Fig. 2 is a horizontal section taken on the line II—II of Fig. 1; and Fig. 3 is a reduced fragmentary section taken on the line III—III of Fig. 1.

Referring to the drawings, a housing 1, forming part of an air compressor or some other piece of machinery, is divided into upper and lower sections that can be bolted together at a horizontal joint. The housing is provided inside with a web 2 that forms a circular opening in which my bearing is mounted. The bearing includes a cylindrical bearing block 3 that is rather thick and that is formed in two half sections bolted together at a horizontal joint. The central portion of this block is encircled by an integral rib 4 that fits snugly within housing web 2 for positioning the block in the housing. To lock the block in the web, the web and rib are provided at their horizontal joints with aligned vertical slots in which rectangular keys 5 are inserted before the two parts of the housing are bolted together. These keys prevent both rotation and axial movement of the bearing block.

Rigidly mounted inside the bearing block is a sleeve bearing 7 made of suitable bearing material. The central area of the inner surface of this sleeve is provided with an annular groove 8 from the upper portion of which a passage 9 extends outwardly through the sleeve and bearing block to one side of rib 4, as shown in Fig. 3. The outer end of this passage is connected by a pipe 10 to a suitable source of lubricating oil that is under high pressure. Passage 9 is made as short as possible so that the entering cool oil will not cool the bearing block.

Rotatably mounted in sleeve 7 is a shaft 12 on which a collar 13 preferably is rigidly mounted, whereby the collar, in effect, forms part of the shaft. The adjacent bearing surfaces between the collar and sleeve are lubricated by a film of oil forced out of the opposite sides of groove 8 and thereby caused to flow along the bearing surfaces toward their opposite ends. The frictional heat that inevitably is generated in the bearing heats the shaft and sleeve and the film of oil between them. The shaft and collar therefore expand, but in the absence of this invention the bearing sleeve, being backed up by the large mass of metal forming block 3 which heretofore has remained considerably cooler than the sleeve, would be restrained by the bearing block from expanding. This would cause the clearance between the bearing surfaces to be reduced so that the film of oil would become still thinner and thereby jeopardize proper lubrication of the bearing as well as cause its temperature to be raised still further.

It is a feature of this invention that this difficulty is avoided by positively heating the bearing block so that it too will expand and thus permit the heated bearing sleeve to expand and keep the bearing clearance substantially constant. Accordingly, a pair of slinger rings 14 are rigidly mounted on shaft collar 13 a short distance from the ends of the bearing sleeve. The radial faces of these rings facing the sleeve intercept the hot oil emerging therefrom and flowing along the collar, and, due to centrifugal force produced by the rotation of the rings by the shaft, throw the hot oil radially away from the shaft. As the curtain of oil leaves the rings it is caught in a sheet metal shield that encircles them and that is shaped around the bearing block to direct the hot oil inwardly against the surfaces of the block. Thus, the block is sprayed constantly by oil that is nearly as hot as the bearing surfaces. This heats the block to a temperature almost as high as that of the bearing sleeve so that it will expand and thus permit the sleeve to expand and maintain the desired clearance between it and the shaft.

The preferred way of making the shield and maintaining it in position is to form it in two half sections 16 separated in a central vertical plane. As shown in Fig. 2, each section is bent transversely to provide a cylindrical portion that encircles the bearing block, and a radial end portion that extends inwardly to a point close to the adjacent slinger ring. Both of these portions of each shield section are spaced a short distance from the bearing block to permit the hot oil thrown from the rings to cover the block. As shown in Figs. 1 and 3, the ends of the shield are connected to the ends of the bearing block in spaced relation therewith by means of screws 17 passing through the shield and threaded in the block with spacing washers 18 between. The inner edges of the shield sections are inserted in annular grooves 19 in the sides of rib 4, where they are held by screws 17. One of the shield sections is provided with an opening through which oil pipe 10 extends, and both sections are provided at the bottom of the bearing with drain holes 20 (Fig. 2) to permit the oil to drain out of the shield into a sump 21 in housing 1 from which the oil may be pumped back into the bearing through pipe 10.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a journal bearing, a bearing sleeve having a bearing surface, a bearing block housing the sleeve, said block and sleeve having an oil passage therethrough terminating at its inner end in the central area of said bearing surface, a shaft journaled in the sleeve, means for supplying lubricating oil under pressure to the outer end of said passage whereby hot oil flows out of the ends of the sleeve, slinger rings rigidly mounted on the shaft at the ends of the sleeve for intercepting said hot oil and throwing it away from the shaft, and a shield encircling said block and rings in close proximity to the block for directing oil from the rings against the ends and periphery of said bearing block to heat it.

2. In a journal bearing, a bearing sleeve having a bearing surface provided with a central annular groove, a bearing block housing the sleeve and engaging it substantially from end to end, said block and sleeve having a short oil passage therethrough terminating at its inner end in said groove, a shaft journaled in the sleeve, means for supplying lubricating oil under pressure to the outer end of said passage whereby hot oil flows out of the ends of the sleeve, slinger rings rigidly mounted on the shaft at the ends of the sleeve for intercepting said hot oil and throwing it away from the shaft, and a shield encircling said block and rings in close proximity to the ends and periphery of the block to form a narrow chamber between the shell and block for directing oil thrown from the rings against said bearing block to heat it.

3. In a journal bearing, a bearing sleeve having a bearing surface, a bearing block housing the sleeve and encircled by a central rib, means surrounding the rib in engagement therewith for supporting the block, said block and sleeve having an oil passage therethrough terminating at its inner end in the central area of said bearing surface, a shaft journaled in the sleeve, means for supplying lubricating oil under pressure to the outer end of said passage whereby hot oil flows out of the ends of the sleeve, slinger rings rigidly mounted on the shaft at the ends of the sleeve for intercepting said hot oil and throwing it away from the shaft, and a shield encircling said rings for directing oil therefrom against said bearing block to heat it, said shield being formed in sections encircling said block on both sides of the rib with their inner edges connected to the sides of the rib, said sections being spaced from the rest of the block and bent transversely to position their outer edges adjacent the rings.

4. In a journal bearing, a bearing sleeve having a bearing surface, a bearing block housing the sleeve and encircled by a central rib provided on each side with an annular groove spaced radially outwardly from the rest of the block, means surrounding the rib in engagement therewith for supporting the block, said block and sleeve having an oil passage therethrough terminating at its inner end in the central area of said bearing surface, a shaft journaled in the sleeve, means for supplying lubricating oil under pressure to the outer end of said passage whereby hot oil flows out of the ends of the sleeve, slinger rings rigidly mounted on the shaft at the ends of the sleeve for intercepting said hot oil and throwing it away from the shaft, a shield encircling said rings for directing oil therefrom against said bearing block to heat it, said shield being formed in sections encircling said block on both sides of the rib with their inner edges disposed in said grooves, said sections being spaced from the rest of the block and bent transversely to position their outer edges adjacent the rings, and means for rigidly connecting the shield to said block.

RONALD B. SMITH.

REFERENCES CITED

The following references are of record in the file of this patent:

UNITED STATES PATENTS

| Number | Name | Date |
|---|---|---|
| 692,982 | Capewell | Feb. 11, 1902 |
| 835,324 | Rice | Nov. 6, 1906 |

FOREIGN PATENTS

| Number | Country | Date |
|---|---|---|
| 442,612 | Germany | Apr. 4, 1927 |